E. JUMISKO.
FISH TRAP.
APPLICATION FILED JULY 3, 1908.

918,058.

Patented Apr. 13, 1909.
3 SHEETS—SHEET 1.

Witnesses
Chas. C. Richardson
M. T. Miller

Inventor
Erick Jumisko,
By Chandler & Chandler
Attorneys.

E. JUMISKO.
FISH TRAP.
APPLICATION FILED JULY 3, 1908.

918,058.

Patented Apr. 13, 1909.
3 SHEETS—SHEET 2.

Witnesses
Chas. C. Richardson.
M. J. Miller.

Inventor
Erick Jumisko,
By Chandlee & Chandlee
Attorneys

E. JUMISKO.
FISH TRAP.
APPLICATION FILED JULY 3, 1908.

918,058.

Patented Apr. 13, 1909.
3 SHEETS—SHEET 3.

Witnesses
Chas. C. Richardson.
M. J. Miller.

Inventor
Erick Jumisko,
By Chandler & Chandler
Attorneys.

UNITED STATES PATENT OFFICE.

ERICK JUMISKO, OF LUDDEN, NORTH DAKOTA.

FISH-TRAP.

No. 918,058.   Specification of Letters Patent.   Patented April 13, 1909.

Application filed July 3, 1908. Serial No. 441,814.

*To all whom it may concern:*

Be it known that I, ERICK JUMISKO, a citizen of the United States, residing at Ludden, in the county of Dickey, State of North Dakota, have invented certain new and useful Improvements in Fish-Traps; and I do hereby declare the following to be a full, clear, and exact description of the invention, such as will enable others skilled in the art to which it appertains to make and use the same.

This invention relates to certain new and useful improvements in fish traps.

The purpose of this invention is to provide a fish-trap adapted to be used in shallow water, and to be set either in a stream or the shoal water of the sea.

Figure 1:
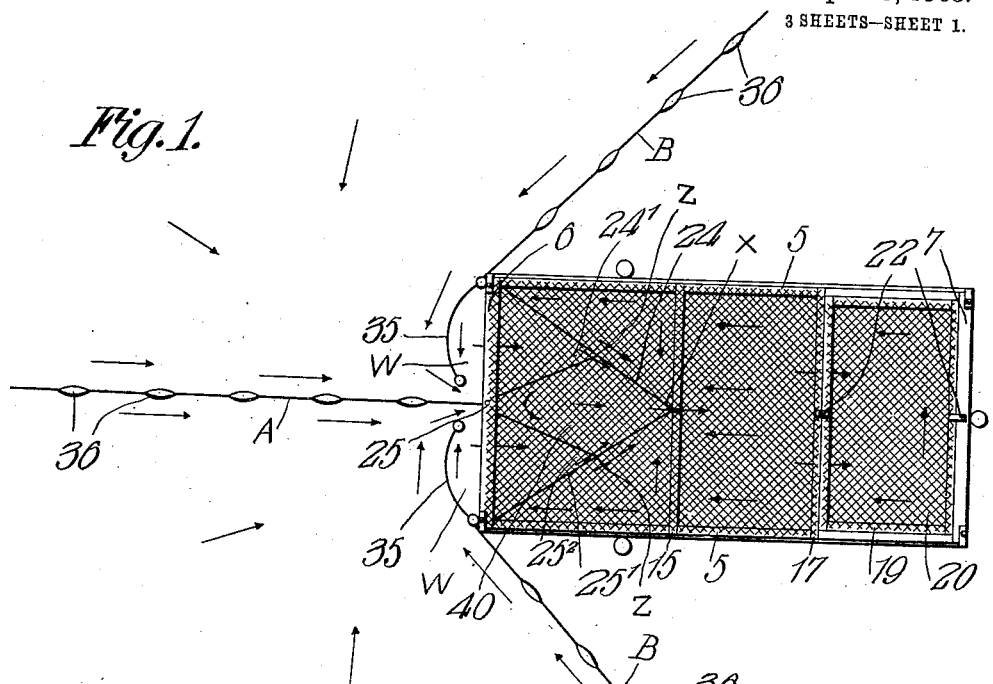
Figure 4:
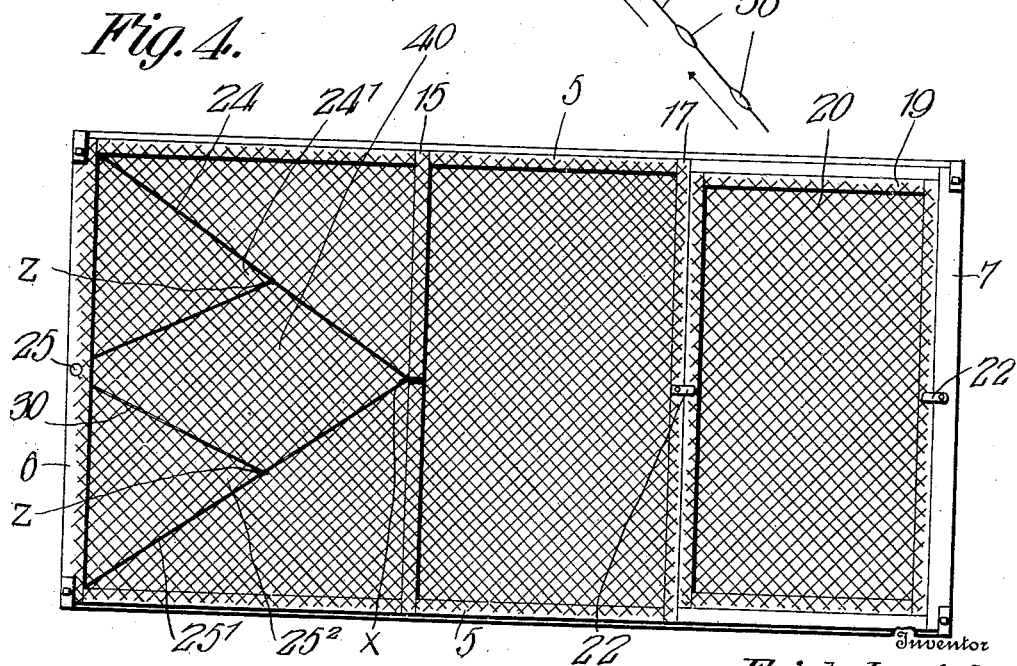
Figure 2:
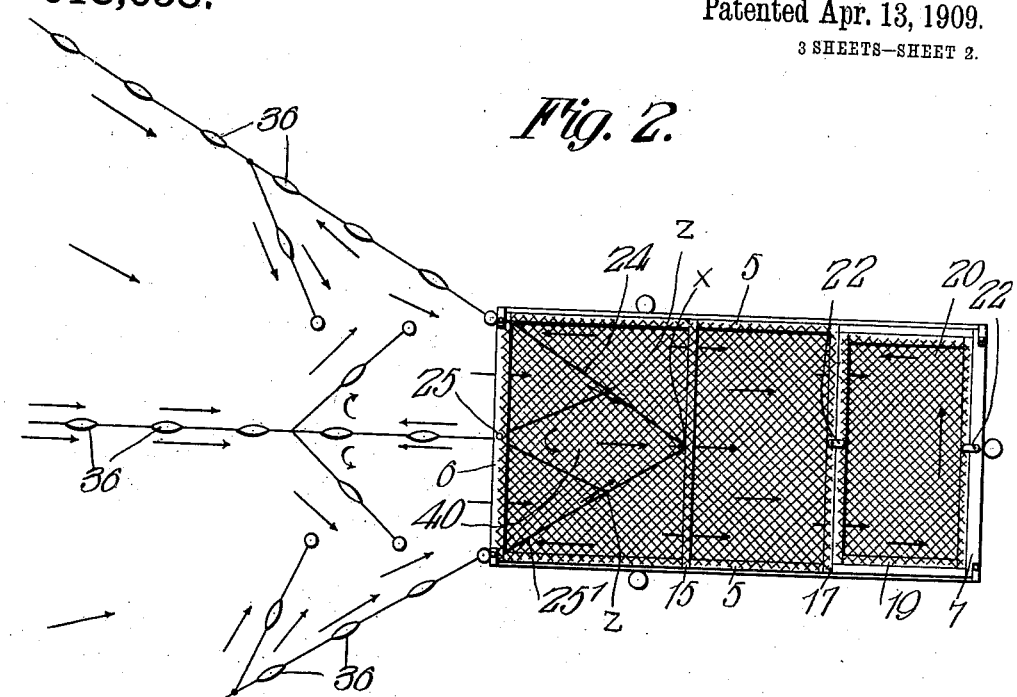
Figure 5:
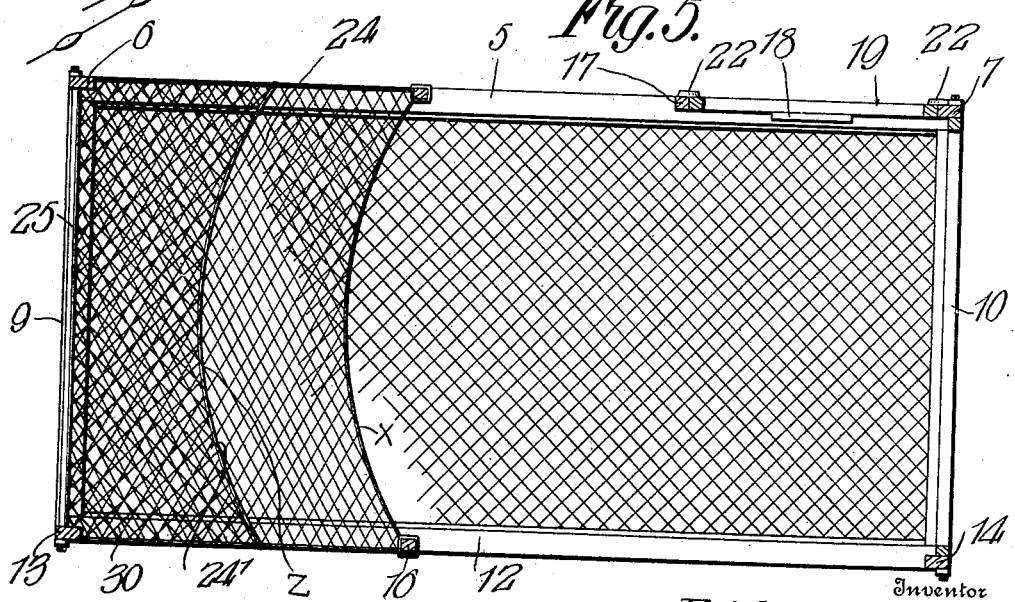
Figure 3:
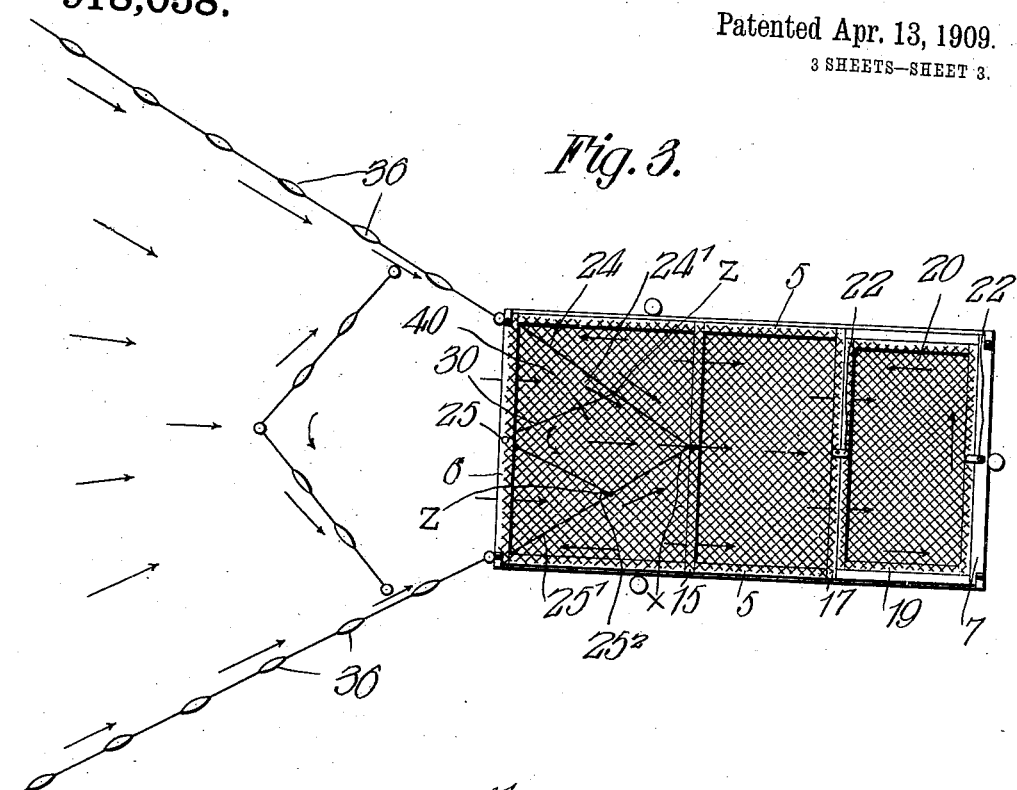
Figure 6:
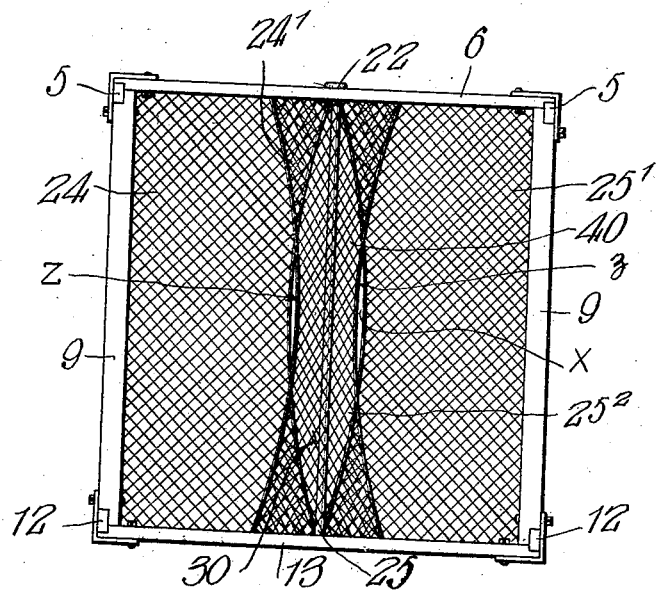

In the accompanying drawings, Figure 1 shows a plan view of a fish trap set where the leader extends from the lake or sea shore. Fig. 2 is a modification showing a plan view of the trap as set in off-shore waters. Fig. 3 is a plan view of a modification illustrating the manner of setting the trap in a stream or river. Fig. 4 shows a top view of the trap. Fig. 5 shows a central sectional view thereof, and Fig. 6 is an end view.

In carrying out the object of my invention, I employ a collapsible or folding trap, from which extends a leader led shoreward, a pound being provided in front of the trap from which the fish escape into a pocket, and then into the trap proper. The trap being set in a stream or body of water for catching fish.

5, 5, represent the side members and 6 and 7 the end members of the upper frame portion of my trap. Extending downward from the corners of this top frame section are the posts 9, 9 and 10, 10, the posts 10 being formed at the forward edge of the upper frame section.

The bottom portion of my trap comprises the two side bars 12, 12 and the end bars 13 and 14. Transversely extending from the bars 5 is the member 15, a counterpart member 16 being positioned below this member 15 as shown in Fig. 5. Above and near the rear bar 7 is positioned a transverse bar 17.

The frame bars 5, 5 are provided with the cleats 18 upon which is removably held a frame 19 covered by suitable netting 20 and forming a door, this door being held by means of the buttons 22. By this means the door frame 19 may be removed at any time when it is desired to remove the caught fish from the trap.

Vertically held between the frame members 6 and 13 is the bar 25, this bar being positioned at the end forming the front of the trap. The entire frame is covered with a netting of a suitable mesh excepting the front or entering opening of the trap. This netting is preferably made of rust proof metal so that the trap may be kept under water the year around if that should be desired.

Extending inward from the forward corner posts 10 are the obliquely held wall sections 24 and 25 which above are secured to the transverse bar 15 and below to the transverse bar 16, so as to form two wall sections held V-shaped in such a manner as to provide an entrance *x* as disclosed in Figs. 4 and 6, this entrance leading into the trap proper.

Secured to the centrally held vertical post 25 is a net section which has its two ends secured to the wall forming neck portions 24 and 25 in such a manner however as to provide the entrance openings *z*. This net section 30 in conjunction with the wall portions 24 and 25 form a diamond-shape pocket, as disclosed in Figs. 1 and 4.

Extending from the two forward corners of the trap are the two net sections 35, 35, which are held in a curved condition and form pounds as clearly indicated in Fig. 1.

Extending from the forward post 25 is the lead A comprising a vertically held netting of any suitable mesh and which in Fig. 1 is disclosed as being extended shoreward. This lead above is provided with suitable floats 36 and below or along the lower edge with suitable sinkers. While the netting used in connection with the trap proper has been described as being made of non-rusting material, this lead net A is preferably made of flax or cotton thread. This lead net is held by means of suitable posts or piles.

Extending from the forward corners of the trap are the laterally extending leaders B.

In Figs. 2 and 3 I have shown modifications in which I use a similar trap but in which the main and central leaders are differently directed and positioned and so also is the pound forming netting differently arranged accomplishing however, the same result.

In the drawings the fish are represented by arrows. In the arrangement of my net the fish following the shore meet the leaders, and turn and follow it first into the pounds w and from these they escape into the pocket 40 from which the fish escape into the trap proper.

While this fish trap may be set in deep water, the same is more particularly adapted to be used in shoal water. If desired the trap may be positioned with a view of retaining the same in one place the year around. This would eliminate the necessity of the fisherman visiting the trap during inclement weather.

It is to be understood that the position of the leads and the location of the pounds may be changed without departing from the spirit of my invention.

And having thus described my said invention, what I claim as new and desire to secure by U. S. Letters Patent is—

1. In a fish trap, the combination with a rigid frame, of a netting covering said frame, said frame being open at one end, two obliquely and inwardly directed net wall sections leading to the corners of the open end of said frame ending proximal to one another to provide an entrance, a net section held V-shaped with the apex of the V outermost the two opposite edges of which are secured proximal to said obliquely held wall sections, to provide a diamond-shaped pocket, and a lead extending outward from the apex of said V-shaped net section.

2. In a fish trap, the combination with a rigid frame, of a netting covering said frame, said frame being open at one end, two obliquely and inwardly directed net wall sections leading to the corners of the open end of said frame, a net section held V-shaped with the apex of the V outermost, the two opposite edges of which are secured proximal to said obliquely held wall sections, a lead extending outwardly from the apex of said V-shaped net section and two lateral leads extending from the forward edge of said frame.

3. A fish trap having in combination, a frame, a netting carried by said frame, the forward end of said frame being uncovered, a diamond-shaped pocket within the forward end of said frame and open at the rear and sides, side walls forming extensions of the rear walls of the pocket connected to the front corners of the frame and a lead extending from the outer edge of said pocket.

4. A fish trap having in combination, a frame, a netting carried by said frame, the forward end of said frame being uncovered, a diamond-shaped pocket within the forward end of said frame and open at the rear and sides, side walls forming extensions of the rear walls of the pocket connected to the front corners of the frame a lead extending from the outer edge of said pocket, and two pound forming net sections directed from the edges of said trap toward said lead.

5. A fish trap having in combination a frame, a netting carried by said frame, the forward end of said frame being uncovered, a diamond-shaped pocket within the forward end of said frame and open at the rear and sides, side walls extending outward from said diamond-shaped pocket, forming extensions of the rear wall of said pocket and connected to the front corners of the frame a lead extending from the outer edge of said pocket, two pound forming net sections directed from the edges of said trap toward said lead, and two lateral leads extending from the edges of said frame and proximal to said pound forming net sections.

In testimony whereof, I affix my signature, in presence of two witnesses.

ERICK JUMISKO.

Witnesses:
EDWARD WAULTAJA,
ELMER HOLMSTROM.